United States Patent [19]

Tokuume et al.

[11] Patent Number: 4,546,392
[45] Date of Patent: Oct. 8, 1985

[54] INFORMATION RECORDING AND REPRODUCING APPARATUS

[75] Inventors: Yoshihiro Tokuume, Tokyo; Hideaki Sato, Yokohama, both of Japan

[73] Assignee: Canon Kabushiki Kaisha, Tokyo, Japan

[21] Appl. No.: 413,990

[22] Filed: Sep. 2, 1982

[30] Foreign Application Priority Data

Sep. 12, 1981 [JP] Japan ................... 56-144271

[51] Int. Cl.⁴ .............................................. G11B 5/04
[52] U.S. Cl. ..................................... 360/30; 360/125
[58] Field of Search ............... 360/125, 8, 30, 60, 360/66, 70, 77

[56] References Cited

U.S. PATENT DOCUMENTS 4,152,733  5/1979  Welwisch ...................... 360/30 X

OTHER PUBLICATIONS

IEEE Transactions on Magnetics, vol. Mag. 16, No. 5, Sep. 1980, "Studies of the Perpendicular Magnetization Mode . . . " by Iwasaki et al., pp. 1111-1113.
IEEE Transactions on Communication, vol. Com. 23, No. 9, Sep. 1975, "Partial Response Signaling" by Kabal et al., pp. 921-934.

*Primary Examiner*—John H. Wolff
*Attorney, Agent, or Firm*—Fitzpatrick, Cella, Harper & Scinto

[57] ABSTRACT

A transmission system, which includes a recorder/reproducer with at least one frequency incapable of producing an output other than a direct current component and which transmits information in a frequency higher than the frequency incapable of producing an output, has an information recording and reproducing apparatus wherein a transformation circuit transforms a first data sequence including the information into a second data sequence, in accordance with frequency characteristics of the transformation circuit, which second data sequence can then be transmitted, and wherein a restoring circuit restores the first data sequence from a third data sequence obtained after transmission.

7 Claims, 16 Drawing Figures

INFORMATION RECORDING AND REPRODUCING APPARATUS

BACKGROUND OF THE INVENTION

1 Field of the Invention

This invention relates to an information recording and reproducing apparatus which may faithfully take out original informations in utilizing a recording and reproducing system wherein informations are lacking in a particular frequency.

2. Description of Prior Arts

Figure 1:
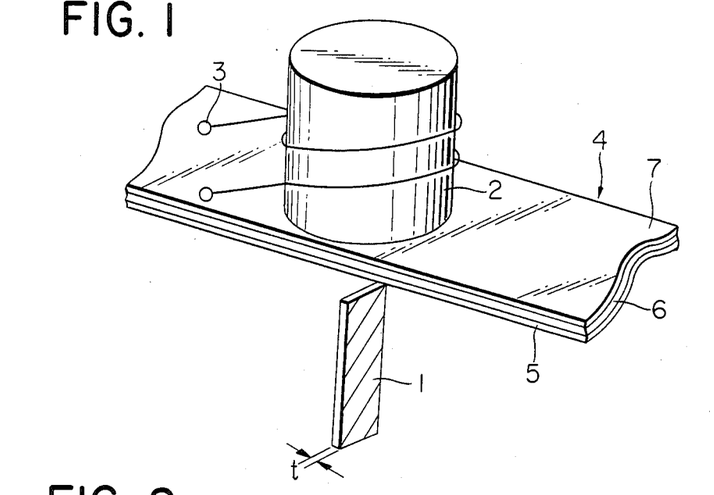
FIG. 1 is a perspective view showing a perpendicular magnetic recording device.

The art of "perpendicular magnetic recording" is detailed in, for example, IEEE TRANSACTIONS ON MAGNETICS, Vol. MAG-16, No. 5 containing a thesis entitled: "Studies of the Perpendicular Magnetization Mode in Co-Cr Sputtered Films". FIG. 1 of the accompanying drawing illustrates one example of an arrangement for such perpendicular magnetic recording. That is, a principal magnetic pole 1 made of a thin film of permalloy having high magnetic permeability is provided, in confrontation to which an auxiliary magnetic pole 2 with a winding 3 being wound therearound is positioned at a predetermined distance from the principal magnetic pole 1, and a magnetic recording medium 4 is interposed between these two magnetic poles. The recording medium 4 is made up of a perpendicular recording layer 5 of Co-Cr alloy and a highly permeable layer 6, both layers 5 and 6 being formed on a base (or substrate) 7.

With the above-described construction of the perpendicular magnetic recording system, when current conduction is effected through the winding 3 on the auxiliary magnetic pole 2, there is generated a magnetic line of force which flows from the auxiliary magnetic pole 2 through the highly permeable layer 6 and converges on the principal magnetic pole 1. At this instant, the perpendicular magnetic recording is effected to the recording layer 5 adjacent to the highly permeable layer 6. The system is also constructed in such a way that, at the time of reproduction, the magnetic line of force from the magnetic recording medium 4 induces flux changes in the winding 3 by its interaction with the principal magnetic pole 1 to thereby obtain a reproduction output.

Figure 2:
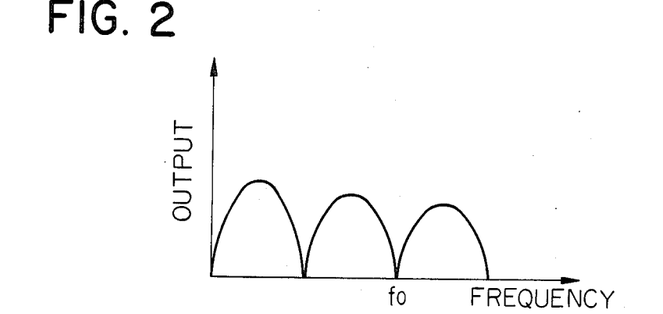
FIG. 2 is a graphical representation showing a frequency characteristic in comb-teeth form of a perpendicular magnetic recording and reproducing system.
Figure 3:
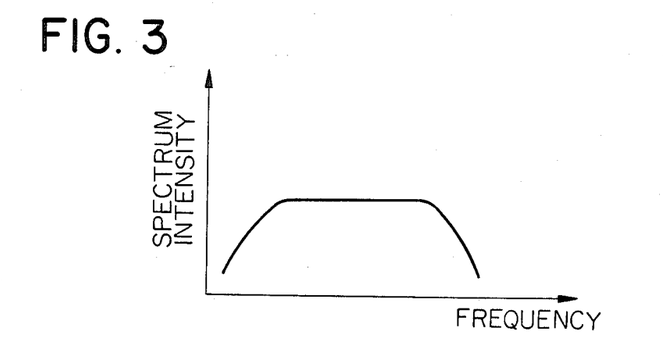
FIG. 3 is a graphical representation showing spectral intensity distribution of a wide band input signal.

It has already been known that the frequency characteristic of this perpendicular magnetic recording system at the time of reproduction is in a comb-teeth form, as shown in FIG. 2, as determined by the thickness t of the principal magnetic pole 1, wherein a frequency band incapable of producing outputs exists at several points. Also, a low frequency region is generally shut off in the magnetic recording system. When a signal having a broad spectral distribution as shown in FIG. 3 is put in the recording and reproducing system having such frequency characteristic as mentioned above, there appear in the spectrum those portions lacking information which makes it difficult to faithfully record or reproduce the original signal. On account of this, there has so far been used a peak portion of a frequency band in the lowest frequency, hence it has been difficult to use even those high frequency portions such as the second and third peaks.

SUMMARY OF THE INVENTION

It is an object of the present invention to provide an improved recording and reproducing system having its frequency characteristic in a comb-teeth form, wherein information in a wide frequency band can be faithfully recorded and reproduced to the original.

It is another object of the present invention to provide a recording and reproducing system with an improved S/N ratio of a signal component in the vicinity of a frequency band where no output can be produced.

DETAILED DESCRIPTION OF PREFERRED EMBODIMENT

The fundamental concept of the present invention resides in that, in order to record and reproduce signals having a wide spectral distribution as shown in FIG. 3, a frequency band having the characteristic as shown in FIG. 2 be utilized effectively in a range of from low frequency to high frequency bands. For this purpose, it is necessary that the frequency characteristic of the transmission system in the entire perpendicular magnetic recording and reproducing system be made equal to the characteristic as shown in FIG. 4 where the frequency band is limited to an ideal band with a value $f_0$ in FIG. 2, for example, as the Nyquist frequency (a band width for use), and that improvement be made in the S/N ratio of the signal component in the vicinity of a frequency bank where no output can be produced.

With a view to recording and reproducing wide band signals with the highest possible fidelity to the original as possible in utilizing a recording and reproducing frequency characteristic containing information lacking portions in one part thereof, the present invention starts from expansion of the concept in the partial response system as disclosed in various technical literatures such as "Partial Response Signaling" published in IEEE Transactions on Communications, Vol. COM-23, No. 9, September 1975; "Partial Response and Its Application" published in Nikkei Electronics, Apr. 4, 1977 Issue; and others, and applies this expanded concept to the effective band utilization in the perpendicular magnetic recording.

Figure 4:
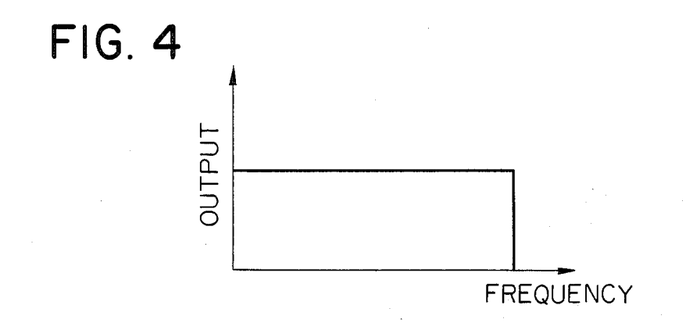
FIG. 4 is a graphical representation showing an ideal band limiting characteristic.

The partial response system as referred to herein is such one that enables the data transmission to be effected at the Nyquist rate (or frequency) without necessity for rendering the characteristics of the transmission system as a whole to be limited to the ideal frequency band as shown in FIG. 4 by purposely adding to the transmission system an intersymbol interference which has conventionally been regarded as undesirable in the data transmission, i.e., by adding to the system the intersymbol interference of a certain definite rule.

Figure 5A:
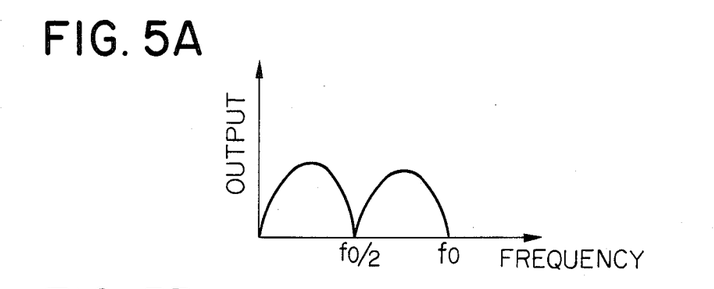
FIGS. 5A, 5B and 5C are respectively graphical representations showing characteristics of the vertical magnetic recording and transmitting system based on actual designs.
Figure 5B:
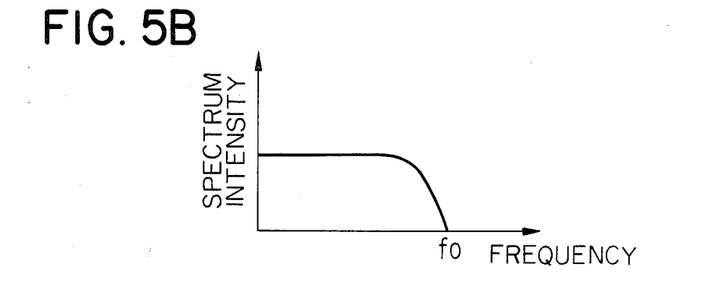

As an example, it is now assumed that up to and including the second tooth in the comb-teeth formed frequency characteristic peculiar to the perpendicular magnetic recording is used, and that the point zero of the second tooth is set to be the Nyquist frequency $f_0$, as shown in FIG. 5A. That is to say, the spectrum of the input signal is contemplated to be as shown in FIG. 5B.

Figure 5C:
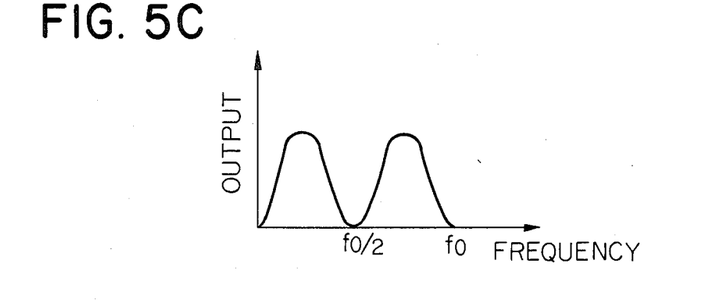
Figure 6:
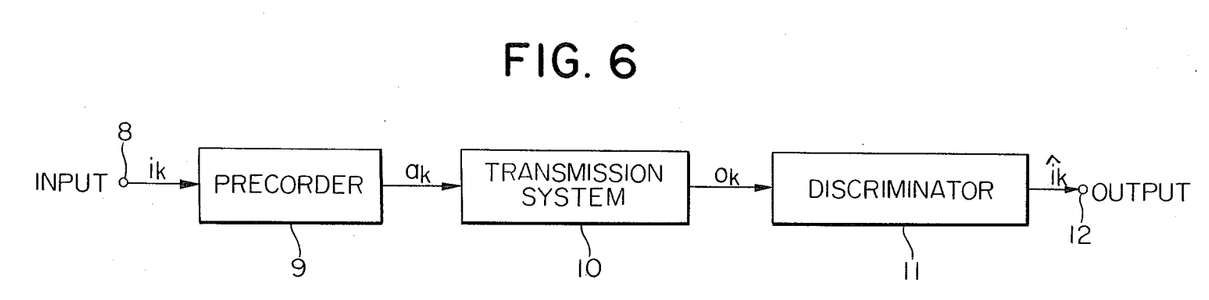
FIG. 6 illustrates a block diagram of the entire recording and reproducing system according to the present invention.

FIG. 6 is a block diagram relative to the system of the present invention. In FIG. 6, the perpendicular magnetic recording and reproducing system is adopted in one part of the transmission system 10, and the frequency characteristic of this transmission system 10 is designed to be as shown in FIG. 5C. The function H(f) in FIG. 5C is represented by the following equation (1), when T is set to be the Nyquist interval.

$$H(f) = 4T \text{ rect } (Tf) \sin^2 (4\pi Tf) \tag{1}$$

$$T = 1/2f_0$$

In the above equation (1), when rect(f) is 1, $|f| \leq \frac{1}{2}$, and when rect(f) is zero, other frequencies are denoted. The impulse response h(t) of the transmission system 10 shown in FIG. 6 can be found by an inverted Fourier conversion of H(f), as follows:

$$h(t) = 2 \sin c \left(\frac{t}{T}\right) - \sin c \left(\frac{t+4T}{T}\right) - \sin C \left(\frac{t-4T}{T}\right) \tag{2}$$

$$\left(\text{where: } \sin c(t) = \frac{\sin \pi t}{\pi t}\right).$$

Figure 7:
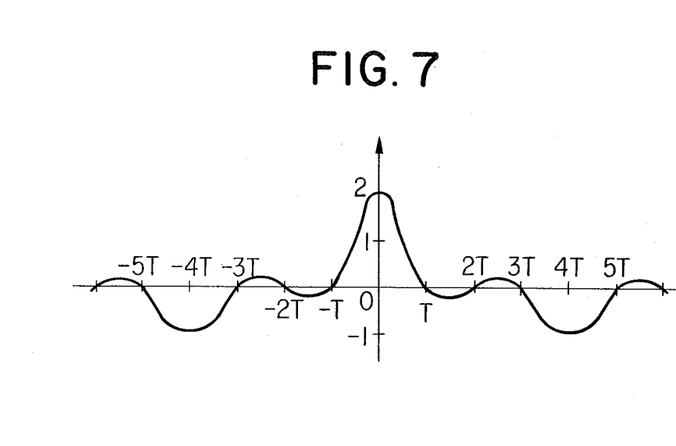
FIG. 7 is a graphical representation showing impulse response of the transmission system in FIG. 5C.

FIG. 7 illustrates the above-described situation. That is to say, those values of the sampling spots at every Nyquist interval T in the output waveform, when the input impulse is introduced into the transmission system 10 shown in FIG. 6, are represented as follows:

$$(h_1, h_2, h_3, h_4, h_5, h_6, h_7, h_8, h_9) = \tag{3}$$

$$(-1, 0, 0, 0, 2, 0, 0, 0, -1)$$

In this instance, the input signal system $\{a_k\}$ and the output signal system $\{o_k\}$ are in the following relationship:

$$o_k = h_1 a_k + h_2 a_{k-1} + \ldots + h_9 a_{k-8} \tag{4}$$

$$= -a_k + 2a_{k-4} - a_{k-8}.$$

The pre-coder 9 shown in FIG. 6 is a code converter which converts an input code system $\{i_k\}$ into a code system of $\{a_k\}$ so that errors occurred in the discriminator 11 may not destroy many of the informations. This can be realized by constructing the code converter in a manner to represent a plurality of code systems in the input code system $\{i_k\}$ from the input terminal 8 in terms of a single code system. The rule of conversion is represented as follows:

$$i_k = [h_1 a_k + h_2 a_{k-1} + \ldots + h_9 a_{k-8}]_{\text{mod } 2} \tag{5}$$

$$= [-a_k + 2a_{k-4} - a_{k-8}]_{\text{mod } 2}$$

In the above equation (5), mod 2 denote the operations with an integer 2 as the modulus, such as:

$$[0] \text{ mod } 2 = 0 \tag{6}$$

$$[\pm 1] \text{ mod } 2 = 1$$

$$[\pm 2] \text{ mod } 2 = 0$$

Figure 8A:
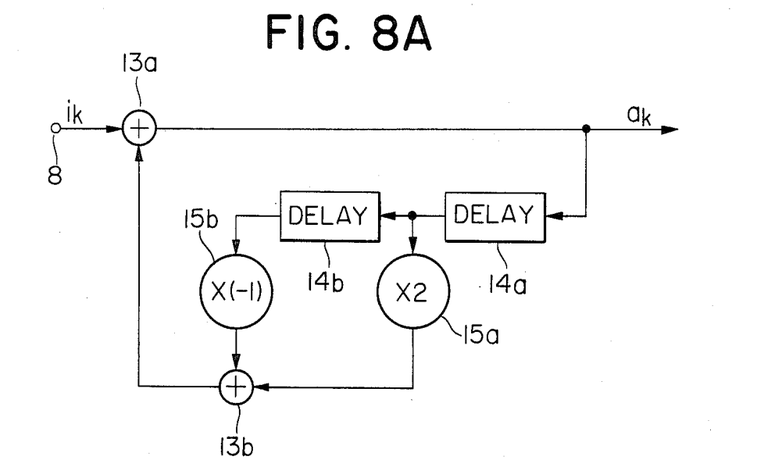
FIG. 8A is a block diagram showing one embodiment of a pre-coder.
Figure 8B:
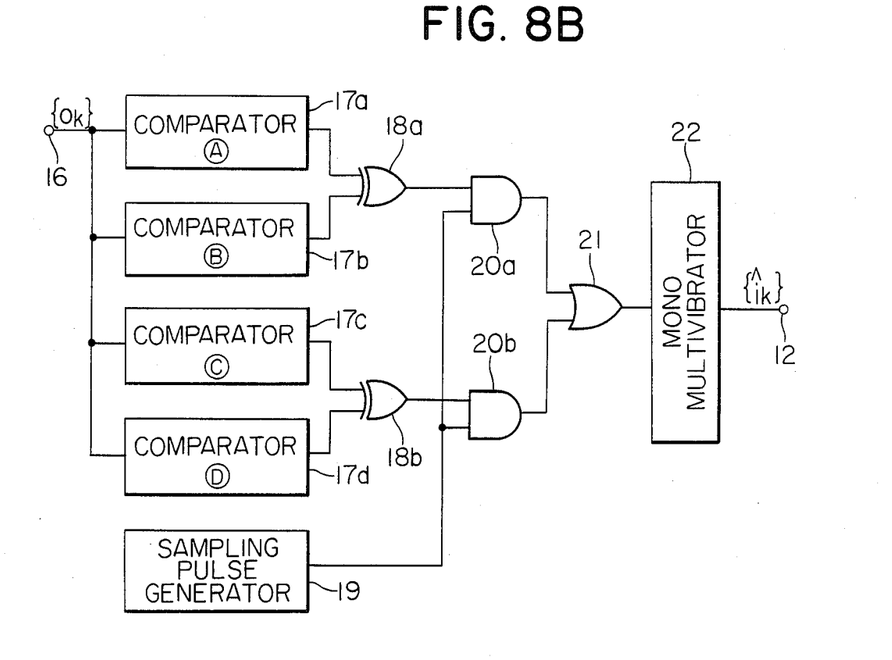
FIG. 8B is a block diagram showing one embodiment of a discriminator.

In the embodiment shown in FIG. 6, the pre-coder 9 is of a construction as shown in FIG. 8A. In the circuit arrangement of FIG. 8A, an input digital signal from the input terminal 8 processes a signal in a circuit 13a, which performs adding operations of the mod 2, to produce an output signal $a_k$, and a part of the output signal is introduced as an input into a 4-bit delay element 14a to delay the signal for 4 bits when the Nyquist interval T is set to constitute 1 bit. An output signal from the delay element 14a is forwarded as an input into another 4-bit delay element 14b and a double ($\times 2$) digital multiplier 15a. Further, an output signal from the delay element 14b is introduced as in input into a $-1$ time ($\times(-1)$) digital multiplier 15b (inverter). A circuit 13b which carries out the adding operations of mod 2 takes thereinto signals from both digital multipliers 15a and 15b, and gives out a signal to the circuit 13a. That is to say, the circuit 13a processes the input signal $i_k$ from the input terminal 8 and the input signal from the circuit 13b, and produces the output signal $a_k$. The output signal $a_k$ is introduced as an input into the winding 3 around the perpendicular magnetic recording and reproducing head as shown in FIG. 1. In the perpendicular magnetic recording and reproducing system, there exist some numbers of frequency bands incapable of producing output, which are determined by thickness t of the principal magnetic pole. This causes the signal $a_k$ composed of a broad frequency band as input into the winding to be converted into the signal $o_k$ having a predetermined frequency characteristic incapable of producing output. On the other hand, the discriminator 11 of the present embodiment has a construction as shown in FIG. 8B. In the circuit structure of FIG. 8B, the input signal $o_k$ from the input terminal 16 is introduced into comparators 17a through 17b. Subsequently, outputs from the comparators 17a and 17b are introduced into an exclusive OR circuit 18a to perform the exclusive logical summation, while outputs from the comparators 17c and 17d are introduced as inputs into an exclusive OR circuit 18b to carry out the exclusive logical summation. Then, output signals from both exclusive OR circuits 18a and 18b are introduced as inputs into one of the terminals of respective AND circuits 20a and 20b. Into the other terminals of the AND circuits 20a and 20b, there are introduced sampling pulses put out from a sampling pulse generator 19 to thereby open the gates. The output signals from the AND circuits 20a and 20b are introduced as inputs into an OR circuit 21 to operate the logical sum. An output signal from the OR circuit 21 is sent into a mono/multi-stable vibrator 22, from which terminal 12 a signal $i_k$ is put out. Here, a discriminated value $i_k$ is represented by the following equation:

$$i_k = \{o_k\}_{mod} \quad (7)$$

The operations of the above equation (7) derives the following result.

$$i_k = i_k \quad (8)$$

In more detail, the input code system $i_k$ as put in the terminal 8 is faithfully reproduced and put out from the terminal 12.

Figure 9A:
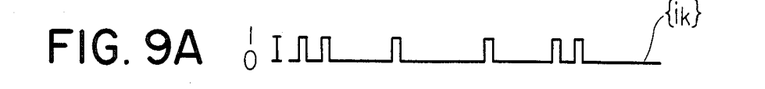
FIGS 9A to 9D illustrate respectively signal waveforms at each section of the recording and reproducing system of the present invention shown in FIG 6.
Figure 9B:
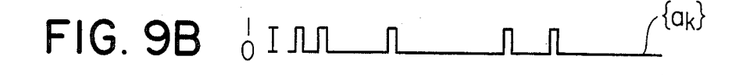
Figure 9C:
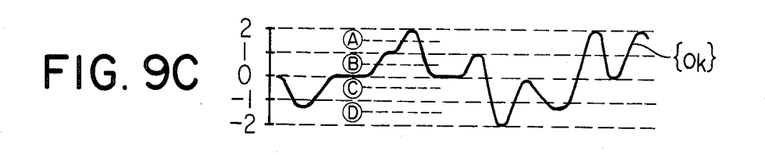
Figure 9D:
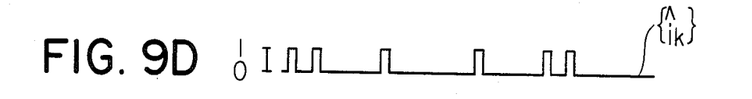

As a concrete example, a signal waveform at the time of introducing the input code train of $\{i_k\} = \{1, 1, 0, 0, 1, 0, 0, 0, 1, 0, 0, 1, 1, 0, 0, 0\}$ as shown in FIG. 9A into the input terminal 8 of FIG. 6 is referred to as $\{a_k\}$, $\{o_k\}$, and $\{i_k\}$ in FIGS. 9B, 9C and 9D, respectively. Then, by sampling the waveform $\{o_k\}$ by the discriminator 11 in FIG. 6, or, more particularly, by setting the comparators 17a to 17d in FIG. 8B at their respective slice levels A to D, the sampling done at the slice levels A to D shown in FIG. 9C. As the result of the level discrimination in five stages as shown in FIG. 9C, there may be obtained five-value levels of $-2, -1, 0, +1$ and $-2$. It will now be seen that $\{i_k\}$ and $\{i_k\}$ become identical by carrying out the operations of mod 2 shown in the equation (6) with respect to these five-value levels.

As the consequence of the above, the frequency characteristic become effectively flat from a low frequency to $f_0$, even when the transmission system having the comb-teeth formed recording and reproducing characteristic is used, whereby there can be obtained a transmission speed equal to that of the recording and reproducing system with $f_0$ as the Nyquist frequency.

In the above-described embodiment, explanations have been given as to the method, in which up to and including the second tooth in the comb-tooth formed recording and reproducing characteristic is effectively utilized. It should, however, be noted that up to and including an arbitrary number m number of teeth (where: $m \geq 2$) may be used in general. In that instance, the fequency characteristic H(f) of the transmission system 10 shown in FIG. 6 may be expressed as follows:

$$H(f) = 4T \text{ rect } (Tf) \sin^2 (2\pi mTf) \quad (9)$$

From the above equation (9), the impulse response h(t) will be as follows:

$$h(t) = 2 \sin c \left(\frac{t}{T}\right) - \sin c \left(\frac{t + 2mT}{T}\right) - \sin c \left(\frac{t - 2mT}{T}\right) \quad (10)$$

In this case, the values of the sampling points at every Nyquist interval T of the received signal waveform, when the impulse is sent into this transmission system, are as follows:

$$h_1 = -1, h_{(m+1)} = 2, h_{(2m+1)} = -1, \text{ and } h_k = 0$$

Figure 10:
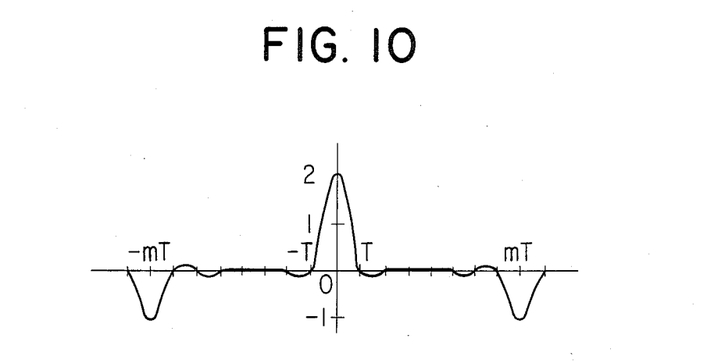
FIG. 10 is a graphical representation showing generalized impulse response in FIG. 7.

(where $k \neq 1, m+1, 2m+1$). FIG. 10 give a graphical representation of these values. In general cases other than the above, it is also possible to carry out the 5-value level judgment using the discriminator of FIG. 6, and to process the signals in the same manner as in the above-described embodiment.

Further, in the above-described embodiment, the frequency characteristic H(f) of the transmission system is determined as that represented by the equation (1). It should, however, be noted that, by rendering the frequency characteristic H(f) to be in a functional form close to the actual characteristic of the perpendicular magnetic recording system, the transmission system can be effectively simplified in its construction.

As has been explained in the foregoing, the recording and reproducing apparatus according to the present invention can exhibit various effects such that, by providing the intersymbol interference with a certain definite rule, there is no need for designing the frequency characteristic of the transmission system as a whole to take a flat shape ranging from a low frequency to a high frequency regions, when the perpendicular magnetic recording and reproducing system is employed as the transmission system, whereby signals in broad frequency bands can be faithfully recorded and reproduced to the original informations.

We claim:

1. Information recording and reproducing apparatus, comprising:
    transmission means including recording/reproducing means having at least one frequency incapable of producing an output other than a direct current component;
    transformation means for transforming a first data sequence including information at frequencies higher than the frequency incapable of producing an output into a second data sequence, in accordance with the frequency characteristics of said transmission means, and for supplying the second data sequence to said transmission means; and
    means for restoring the first data sequence from a third data sequence provided ater transmission by said transmission means.

2. Data recording and reproducing apparatus, comprising:
    transmission means including recording/reproducing means wherein intersymbol interference occurs between a record signal and a reproduction signal;
    transformation means for transforming a first data sequence, adapted to be transmitted at intervals set such that impulse responses from said transmission means approximate an integer ratio at sampling points, into a second data sequence in response to said impulse responses, and for supplying the second data sequence to said transmission means; and
    means for restoring the first data sequence from a third data sequence provided after transmission by said transmission means.

3. Data recording and reproducing apparatus, comprising:
    transmission means including recording/reproducing means wherein intersymbol interference occurs between a record signal and a reproduction signal, said transmission means having frequency characteristics such that the impulse response of said transmission means is set in an integer ratio at each sampling point of a data sequence transmitted by said transmission means;
    transformation means for transforming a first data sequence into a second data sequence in response to said impulse response and for supplying the second data sequence to said transmission means; and means for restoring the first data sequence from a third data sequence provided after transmission by said transmission means.

4. A data transmission system, comprising:
transmission means having cut-off characteristics represented by frequencies of integer times of a predetermined frequency fx;
transformation means for transforming a first data sequence having a Nyquist frequence m.fx (wherein m is an integer more than 2) into a second data sequence in accordance with the frequency characteristics of said transmission means and for supplying the second data sequence to said transmission means; and
means for restoring the first data sequence from a third data sequence provided after transmission by said transmission means.

5. A system according to claim 4, wherein said transmission means includes vertical magnetic recording/reproducing means.

6. A system according to claim 5, wherein said transmission means further includes frequency characteristic compensation means having frequency characteristics for setting the impulse response of said transmission means in an integer ratio at each sampling point of the second data sequence.

7. A system according to claim 6, wherein the frequency characteristics H(f) of said transmission means in a frequency band lower than said Nyquist frequency is represented by:

$$H(f) = 4T\sin^2(2\pi mTf),$$

where T is a Nyquist interval ($\frac{1}{2}f_o$).

* * * * *

UNITED STATES PATENT AND TRADEMARK OFFICE
CERTIFICATE OF CORRECTION

PATENT NO. : 4,546,392

DATED : October 8, 1985

INVENTOR(S) : YOSHIHIRO TOKUUME, ET AL.

It is certified that error appears in the above-identified patent and that said Letters Patent is hereby corrected as shown below:

Column 2, line 54, change "bank" to --band--.

Column 4, line 68, change "$i_k$" to --$\hat{i}_k$--.

Column 5, line 4, change "$i_k$" to --$\hat{i}_k$--;

line 9, change "$i_k$" (first occurrence) to --$\hat{i}_k$--;

line 18, change "$i_k$" to --$\hat{i}_k$--;

line 26, after "and" change "-2" to -- +2 -. and change "$i_k$" (first occurrence) to --$\hat{i}_k$--;

line 44, change "fequency" to --frequency--.

Column 6, line 37, change "ater" to --after--.

Signed and Sealed this

Fifth Day of August 1986

[SEAL]

Attest:

DONALD J. QUIGG

Attesting Officer

Commissioner of Patents and Trademarks